Patented June 24, 1952

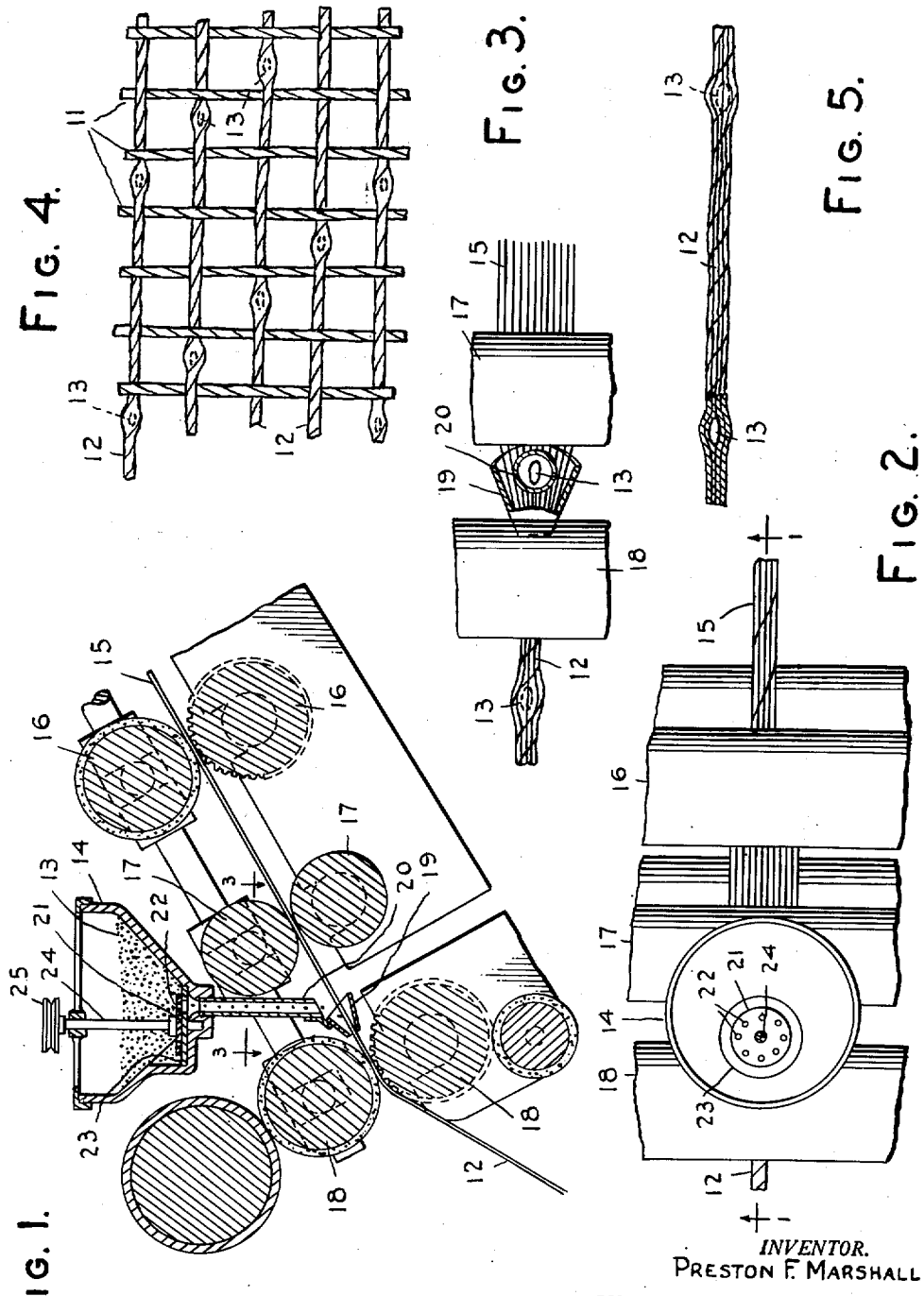

2,601,620

UNITED STATES PATENT OFFICE 2,601,620

METHOD AND APPARATUS FOR PREPARING GRASS SEED FOR PLANTING

Preston F. Marshall, Washington, D. C.

Application July 28, 1947, Serial No. 764,062

10 Claims. (Cl. 47—1)

This invention relates to planting seeds, such as lawn grass seeds for example, which are usually sown broadcast upon the surface of the ground and which are subject to being blown away by wind or washed away by rain before they can germinate and take root.

The invention contemplates twisting the seeds into strands of fibrous material and weaving the strands into an open mesh fabric so as to distribute the seeds uniformly throughout the length and breadth of the fabric, whereupon the fabric may be spread over the area to be seeded and retained in place by pegs or a thin cover of earth, or by other suitable means.

Preferably the fabric is loosely woven from yarn made largely of cotton linters, waste or other fibrous material available in large quantity at a low price wherein the seeds have been enmeshed during the operation of drafting and spinning the yarn. After weaving, the fabric is preferably impregnated with insect repellant and fertilizer suitable for the seeds used and the character of the soil in the locality where the seeds are intended to be sown.

The invention aims to retain all the seeds sown in condition for germinating in the place where sown so as to reduce the loss of seeds from scattering by wind and rain and stimulate the growth, improve the coverage and stand of grass or the like obtainable from a given quantity of seeds. I am aware that seeds have been enclosed in paper strips or woven or braided into ribbons for planting in rows, but so far as I am aware, no one has twisted seeds into yarn during the drafting and spinning thereof and then woven the yarn so formed into an open mesh cloth which can be spread over the ground to be seeded.

The invention further aims to improve the means and apparatus for feeding the seeds to the yarn as it goes through the spinning frame or other suitable part of the apparatus preparatory to spinning; and to adapt existing kinds of looms to weaving fabric from yarn carrying seeds spaced lengthwise thereof without interfering with their normal functioning or speed of operation.

Other aims and advantages of the invention appear in connection with the following description of an illustrative form thereof as shown in the accompanying drawings, wherein:

Figure 1 is a vertical cross-sectional view on the line 1—1 in Figure 2 of a spinning frame equipped with a hopper and means for dropping seeds into the roving entering the last set of drafting rolls prior to spinning it into yarn;

Figure 2 is a plan view of a portion of the apparatus illustrated in Figure 1; with the top of the hopper removed;

Figure 3 is an enlarged horizontal cross-section of a portion of the apparatus taken on the line 3—3 in Figure 1;

Figure 4 is a face view of a piece of woven material comprising plain threads or yarns extending warp-wise (lengthwise) and threads or yarns carrying seeds entwisted therein at spaced intervals extending filling-wise (cross-wise); and Figure 5 is an enlarged view of a thread or yarn made of a plurality of filaments or staples twisted together to confine and retain seeds at spaced intervals lengthwise thereof, life reference characters representing the same parts in the several views.

In the form of the invention illustrated, the fabric, as shown in Figure 4, is made of warp yarns 11 and filling yarns 12, woven in a plain weave in any conventional manner, there being four ends per inch in the warp and five ends per inch in the filling. The filling yarns carry fine seeds 13, of the size of grass seeds, such as blue grass or Italian rye, spaced one or more inches apart; and either before or after weaving the yarns may be impregnated with any of the various liquid preparations sold as plant food or fertilizer, and with an insect repellant or poison having no harmful effect upon young plants, of which there are several on the market.

For planting lawn grass and clover seeds I find that a yarn made of cotton waste of a size such that there are from 4200 yards to 16,800 yards to the pound, depending upon the kind of seeds used, is satisfactory. Care must be taken not to twist the yarn containing the seeds too hard in order that it may disintegrate rapidly when exposed to the weather, from five to fifteen turns per inch being sufficient to enable it to be woven as filling without undue breakage in the loom.

Suitable means for feeding the seeds from a supply hopper 14 to the roving 15 in a spinning frame of usual construction containing three pairs of drafting rolls 16, 17 and 18, are shown in Figures 1, 2 and 3 of the drawings. The roving 15 enters the first set of rolls 16 in a round roving and at a speed of about 40 inches per minute; and the rolls 17 are driven at such a speed that the roving enters them in a flat wide band at about 80 inches per minute, thus approximately doubling the length of the roving in the space between these two sets of rolls.

Between the rolls 17 and the last set of rolls 18 from which the roving goes to the spindle, there is an increase of about six times in the length of the roving, as the rolls 18 rotate at a speed of about 150 revolutions per minute. The spindle (not shown) may rotate at a speed of 7500 R. P. M., more or less, in order to put the desired number of turns per inch into the thread, as is well known.

In the space between the sets of rolls 17 and 18 there is located a funnel or trumpet 19 through which the flat band of roving passes and is folded up and over at the sides to narrow its width and enclose the seeds 13 as they are dropped upon it from the feed tube 20 leading from the hopper. The hopper, feed tube and funnel are supported in any suitable manner in the space between and above the upper rolls 17 and 18, as shown in Figure 1. The hopper is fitted with a feed wheel 21 provided with a series of feed openings 22 and which rotates above a perforated bottom plate 23, the perforation in the bottom plate being vertically over the upper end of the feed pipe 20. Rotation of the feed wheel 21 is effected by means of a shaft 24 provided with a pulley 25 driven from a suitable source of power, such as a small variable speed electric motor, not shown.

As the wide band of roving passes through the space between the sets of rolls 17 and 18, where it is under strong tension, it is folded into trough shape by the trumpet 19 and any seeds falling onto it from the feed tube 20 will be encompassed by the parallel fibers as they converge in the throat of the trumpet and become entangled therein before entering the last set of rolls 18 where they are squeezed into intimate association with the material of the yarn. Upon emerging from the rolls 18, the yarn is subjected to twisting by the rapid rotation of the spindle as is well known in this art, and the fibers are so twisted around the seeds as to cover them completely and retain them in place during the subsequent treatment and weaving of the yarn.

I find that loosely twisted yarns bearing seeds may be woven without difficulty as the shuttle threads in looms of standard and well known make, the warp yarns being plain with more twist, to form a fabric having sufficient strength for handling and readily disintegrating upon exposure to weather.

The invention is not restricted to the yarn and cloth construction described by way of example, but may be applied to various textile materials, natural and synthetic, which can be laid in parallel strands and given enough twist in the existing kinds of textile machinery to retain fine seeds during the weaving operation and until planted and germinated as herein described.

What I claim and desire to secure by Letters Patent is as follows:

1. The method of seeding which consists in entwining fine seeds in the filling yarns of an open mesh woven fabric at spaced intervals, laying the fabric on the area to be seeded and securing it in place against removal by natural causes prior to germination of the seeds.

2. The method of seeding utilizing textile material which consists in entwining fine seeds in the filling yarns of an open mesh woven fabric at spaced intervals, impregnating the textile material with an aid to plant growth, laying the fabric on the area to be seeded, and securing it in place against removal by natural causes prior to germination of the seeds.

3. The method of seeding utilizing textile material which consists in entwining fine seeds in the filling yarns of an open mesh woven fabric at spaced intervals, impregnating the textile material with fertilizer, laying the fabric on the area to be seeded and securing it in place against removal by natural causes prior to germination of the seeds.

4. The method of seeding utilizing textile material which consists in entwining fine seeds in the filling yarns of an open mesh woven fabric at spaced intervals, impregnating the textile material with insect repellant, laying the fabric on the area to be seeded and securing it in place against removal by natural causes prior to germination of the seeds.

5. A yarn for use in seeding comprising loosely twisted fibers of textile material of such size that there are from 4200 to 16,800 yards to the pound thereof laid in parallel strands suitable for weaving and encompassing, entangling and entwining seeds at spaced intervals.

6. A yarn for use in seeding comprising loosely twisted fibers laid in parallel strands suitable for weaving and impregnated with an aid to plant growth, and encompassing, entangling and entwining seeds at spaced intervals.

7. An open mesh woven fabric for use in seeding consisting of plain warp threads and loosely twisted filling threads encompassing, entangling and entwining seeds at spaced intervals.

8. An open mesh woven fabric for use in seeding consisting of plain warp threads and loosely twisted filling threads encompassing, entangling and entwining seeds at spaced intervals and impregnated with a material consisting of fertilizers and insect repellants.

9. An open mesh woven fabric for use in seeding consisting of plain warp threads and loosely twisted filling threads of textile material encompassing, entangling and entwining seeds at spaced intervals and impregnated with fertilizer.

10. An open mesh woven fabric for use in seeding consisting of plain warp threads and loosely twisted filling threads of textile material encompassing, entangling and entwining seeds at spaced intervals and impregnated with insect repellant.

PRESTON F. MARSHALL.

REFERENCES CITED

The following references are of record in the file of this patent:

UNITED STATES PATENTS

| Number | Name | Date |
| --- | --- | --- |
| 81,291 | Richards | Aug. 18, 1868 |
| 421,823 | Duxbury | Feb. 18, 1890 |
| 614,002 | Jenkins | Nov. 8, 1898 |
| 851,171 | Israel | Apr. 23, 1907 |
| 942,938 | Schmunk | Dec. 14, 1909 |
| 1,143,980 | McComb | June 22, 1915 |
| 1,611,119 | Lipper | Dec. 14, 1926 |
| 1,912,914 | O'Brien | June 6, 1933 |
| 1,971,504 | Pratt | Aug. 28, 1934 |
| 2,043,333 | Purdy | June 9, 1936 |
| 2,192,939 | Slayter | Mar. 12, 1940 |
| 2,243,857 | Fischer | June 3, 1941 |
| 2,257,738 | Fischer | Oct. 7, 1941 |
| 2,323,746 | Woolf | July 6, 1943 |
| 2,334,542 | Cavedon | Nov. 16, 1943 |

FOREIGN PATENTS

| Number | Country | Date |
| --- | --- | --- |
| 13,067 | Great Britain | 1912 |